Figure 1:
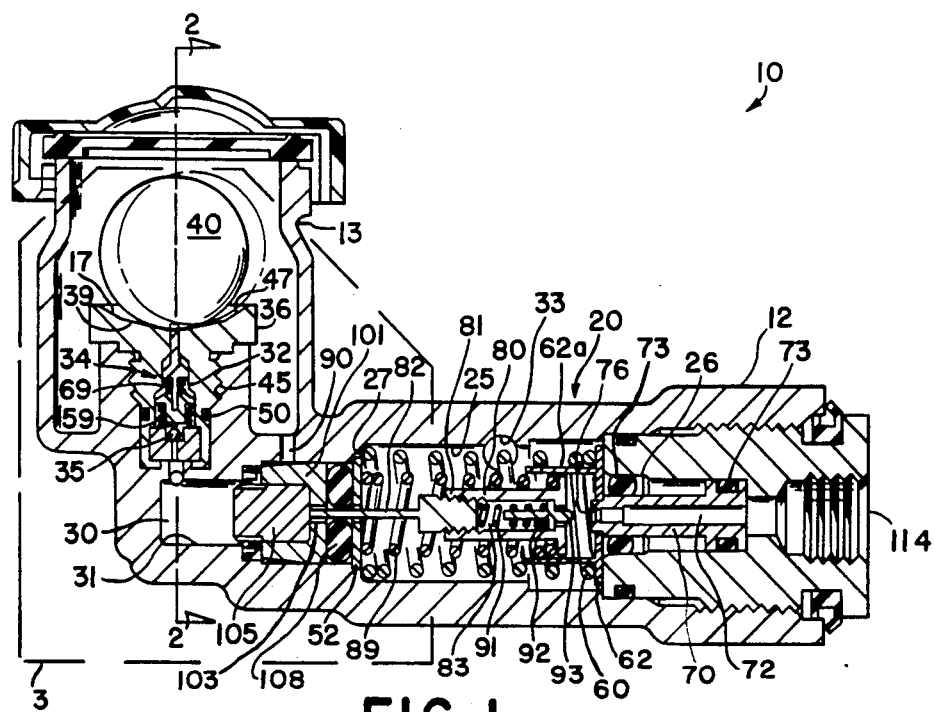

United States Patent [19]

Myers et al.

[11] Patent Number: 4,679,864
[45] Date of Patent: Jul. 14, 1987

[54] DECELERATION AND PRESSURE SENSITIVE PROPOPTIONING VALVE WITH LOW DECELERATION RESPONSIVENESS

[75] Inventors: Lawrence R. Myers; Lloyd G. Bach, both of South Bend, Ind.; Robert F. Gaiser, Stevensville, Mich.

[73] Assignee: Allied Corporation, Morristown, N.J.

[21] Appl. No.: 850,463

[22] Filed: Apr. 11, 1986

[51] Int. Cl.[4] .............................................. B60T 8/28
[52] U.S. Cl. .................................... 303/6 C; 60/591; 188/349; 303/24 A; 303/24 C; 303/24 F
[58] Field of Search ............... 303/6 C, 24 A, 24 C, 303/24 F, 24 R, 6 R, 24 B, 24 BB; 188/195, 349, 112 A, 112 R; 60/564, 591

[56] References Cited

U.S. PATENT DOCUMENTS

| | | | |
|---|---|---|---|
| 3,147,042 | 9/1964 | Stelzer | 303/24 F X |
| 3,476,443 | 11/1969 | Bratten et al. | 303/24 C |
| 4,196,937 | 4/1980 | Falk | 303/24 F |
| 4,205,883 | 6/1980 | Gaiser | 303/24 F |
| 4,331,364 | 5/1982 | Koshimizu et al. | 303/6 C X |
| 4,412,702 | 11/1983 | Bach et al. | 303/6 C |
| 4,477,123 | 10/1984 | Schnürer | 303/24 R |
| 4,509,800 | 4/1985 | Kubota | 303/6 C |
| 4,595,243 | 6/1986 | Gaiser | 303/6 C |

Primary Examiner—Douglas C. Butler
Attorney, Agent, or Firm—Larry J. Palguta; Ken C. Decker

[57] ABSTRACT

A proportioning valve assembly (10) in a housing (12) is pressure responsive to control the flow of fluid to a wheel brake cylinder. The proportioning valve (20) is connected to a channel (31) opening into a reservoir or fluid-containing chamber (13), a second valve (34) being disposed in the channel (31) and engaging at one end an inertia sensitive ball (40) located on a variable slope surface (17), and engaging a third valve (35) at the other end. The proportioning valve (20) includes a second piston (80) having a reduced diameter end (82) engaging a third piston (105) of enlarged diameter disposed in a portion of the channel (31), the channel (31) communicating by an opening (90) with the fluid-containing chamber (13). During initial brake application by the operator, the third valve (35) remains closed so that the third piston (105) does not move and prevents further movement of the second piston (80), thereby preventing higher braking pressure from being communicated to the wheel brake cylinder. Upon obtaining an initial level of deceleration, the inertia sensitive ball (40) moves along an initial low slope portion (39) of the surface (17) so that the third valve (35) opens and permits movement of the third piston (105) by the second piston (80) so that higher braking pressures are communicated to the wheel brake cylinder. The proportioning valve assembly (10) eliminates the communication of excessive pressure to a brake assembly during vehicle travel on a low coefficient of friction roadway surface.

26 Claims, 4 Drawing Figures

DECELERATION AND PRESSURE SENSITIVE PROPOPTIONING VALVE WITH LOW DECELERATION RESPONSIVENESS

This invention relates to a deceleration and pressure sensitive proportioning valve for the brake system of a vehicle, the valve preventing the communication of excess pressure to the brakes when the vehicle is traveling on a low coefficient of friction roadway surface.

U.S. Pat. No. 4,595,243 and copending application No. 738,116 disclose proportioning valve assemblies which may be disposed entirely within or without the body of the master cylinder, and provide for deceleration and pressure sensitive response in order to reduce fluid pressure communicated to the rear wheels. By reducing brake fluid pressure applied to the rear wheels in loaded and unloaded vehicle situations, appropriate braking pressures are communicated to the rear wheels in accordance with vehicle loading so that braking distance will be shortened and wheel lock-up and subsequent skidding is minimized. Copending Application Ser. No. 944,079 illustrates a proportioning valve assembly connected with a torque sensing valve. Copending patent application Ser. Nos. 799,219 and 924,966 illustrate alternative embodiments which eliminate the need for fluid-containing chambers or reservoirs and provide completely self-contained proportioning valve assemblies.

It is desirable to provide a deceleration and pressure sensitive proportioning valve assembly which also prevents the communication of excess fluid pressure to the rear brakes while the vehicle is traveling on a low coefficient of friction roadway surface such as ice. The present invention provides a solution for minimizing or eliminating wheel lock-up while the vehicle is traveling on a low coefficient of friction roadway surface, in addition to reducing displacement losses and improving replenishment of fluid to the assembly.

The present invention provides a proportioning valve assembly which includes a housing having an inlet and an outlet, a first piston disposed in the housing and subject to inlet and outlet pressures so that the valve assembly provides a pressure at the outlet reduced from the pressure at the inlet, spring means biasing the first piston toward an end of the housing, a second piston disposed within the housing and movable relative to the first piston, the second piston having an interior cavity, resilient means acting on said second piston, poppet valve means disposed within an interior cavity of the second piston and extendable therefrom, a spring-biasing said poppet valve means toward the outlet, channel means for connecting said housing with a fluid-containing chamber or reservoir, second valve means disposed in said channel and including means for biasing seat closure means toward a valve seat, an inertia sensitive object engaging said second valve means, third valve means disposed within said channel and engaged by said second valve means, the inertia sensitive object disposed within the fluid-containing chamber and deceleration causing the object to move away from the second and third valve means which operate sequentially to open and provide communication with the fluid-containing chamber and then close and prevent communication with the fluid-containing chamber and thereby cooperate in reducing pressure at the outlet, the second piston having a reduced diameter end part which extends within a sleeve disposed about a third piston having an enlarged diameter, the third piston and sleeve disposed within a portion of the channel communicating with the fluid-containing chamber by means of an opening therebetween, the valve assembly being responsive to loaded and unloaded conditions of the vehicle and low coefficient of friction roadway surfaces.

Figure 2:
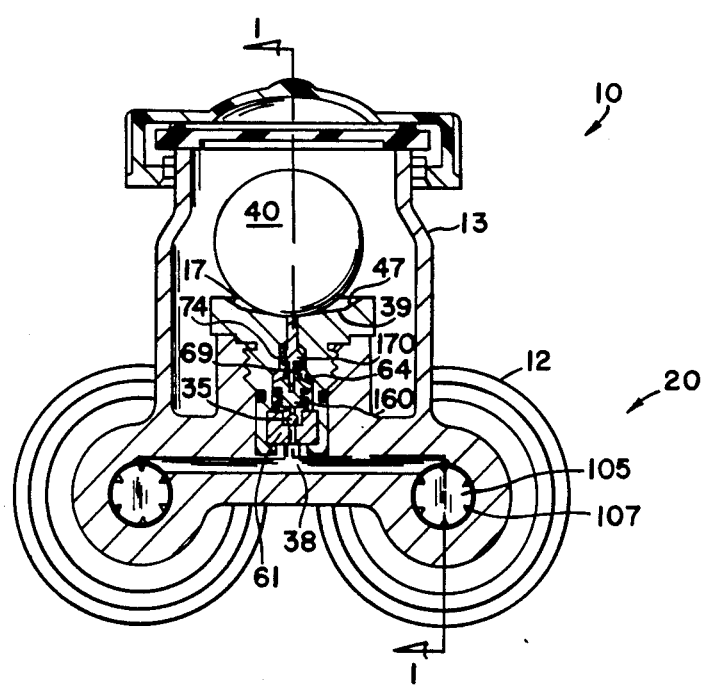
Figure 3:
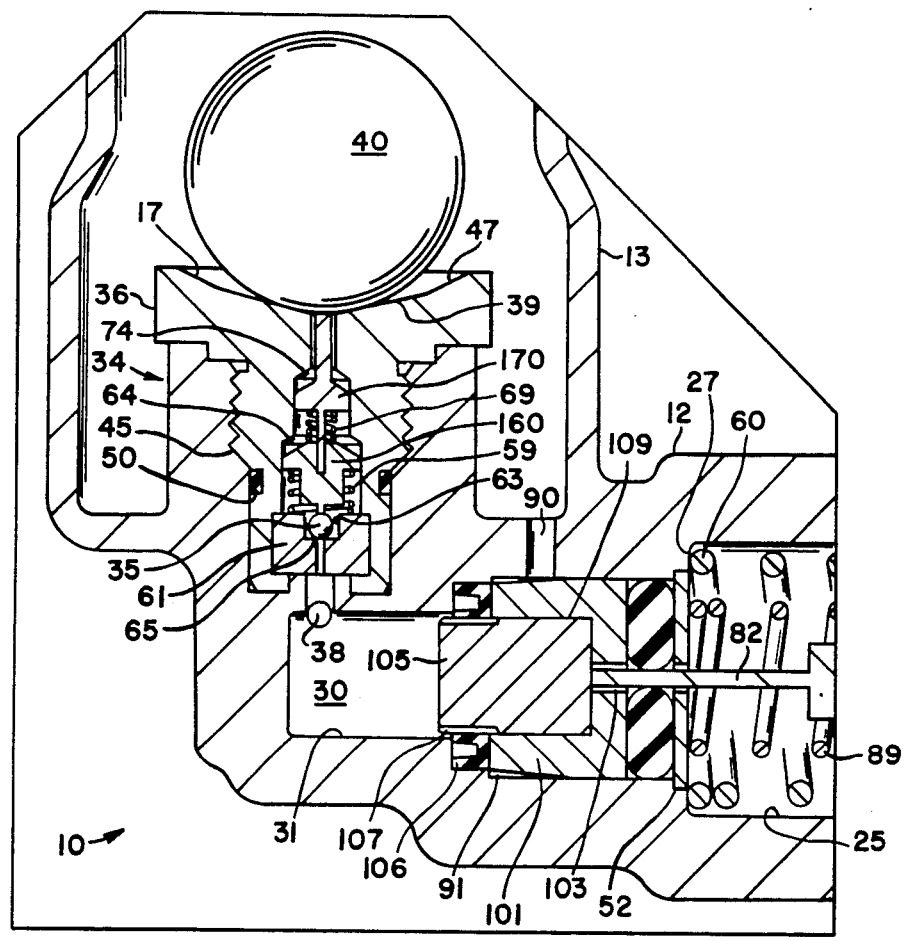
Figure 4:
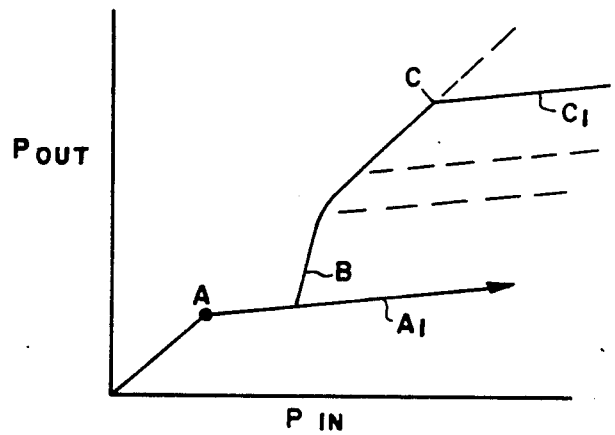

The accompanying drawings show, for the purpose of exemplification and without limiting the invention of the claims thereto, an embodiment illustrating the principles of this invention wherein:

FIG. 1 is a section view of the proportioning valve assembly of the present invention, FIG. 2 is an end section view of the proportioning valve assembly, FIG. 3 is an enlarged partial view of a portion of FIG. 1, and FIG. 4 is a graph of $P_{out}$ vs $P_{in}$ for the proportioning valve assembly of the present invention.

FIGS. 1-3 illustrate an embodiment of the proportioning valve assembly of the present invention and which is designated generally by the reference numeral 10. The proportioning valve assembly 10 may be contained within a housing 12 that is separate from the body of the master cylinder (not shown), and which has its own fluid-containing chamber or reservoir 13. Copending patent application Ser. No. 738,116 discloses a deceleration and pressure sensitive proportioning valve assembly which has high pressure damping and the Application is incorporated by reference herein. The proportioning valves 20 (see FIG. 2) contained within the housing 12 are for a split braking circuit having a fluid pressure outlet 114 communicating with a rear wheel cylinder and another fluid pressure outlet (not shown) communicating with the other rear wheel cylinder. FIGS. 1 and 3 illustrate a bore 25 which communicates with the master cylinder (not shown) by means of passageway 33. Bore 25 communicates with a cavity 30 of channel 31 that communicates with the chamber 13, channel 31 including a stepped opening 32 comprising the opening of a second valve 34. Second valve 34 may comprise any one of numerous valve constructions which would function appropriately in the present invention, and herein comprises redundant serially aligned valves 160 and 170. An inertia sensitive ball 40 is located separate from the path of fluid flow through proportioning valve 20 and within chamber 13 on a variable slope ramp or surface 17. Inertia sensitive ball 40 holds second valve 34 open until a certain predetermined attitude is attained by the vehicle during deceleration or when deceleration displaces ball 40 up ramp 17.

Bore 25 includes a reduced diameter portion 26 having therein a differential piston 70. Differential piston 70 includes through opening 72 providing for communication of outlet 114 with bore 25. Seals 73 are disposed about differential piston 70 which has valve seat 76 extending into bore 25 and with washer 62 disposed thereabout. A first spring 60 biases the washer 62 and differential piston 70 to the right in FIG. 1, with one end of the spring 60 abutting bore shoulder 27. A second piston 80 comprises a longitudinal member having one end threadably received in and supporting enclosure 81 guided by washer extension 62a and the other reduced diameter end 82 extending into cavity 30 of channel 31. Enclosure 81 defines a cavity 83 which contains poppet 92 biased by spring 91 toward valve seat 76. Spring 89 seats on washer 52 and biases the second piston to the right in FIG. 1. Reduced diameter end 82 of second piston 80 is received within a bore 103 of stationary sleeve 101. Seal 108 provides sealing engagement between second piston end 82 and the walls of channel 31.

The inertia sensitive ball 40 is disposed in a location that is separate from a fluid flow path leading from the master cylinder to the associated rear brakes. Thus, the inertia sensitive ball is not subject to fluid flow characteristics that occur within the fluid flow path during braking. Ball 40 is disposed on the variable slope surface or ramp 17 of valve body 36. The proportioning valves 20 illustrated in FIG. 2 are connected together by channel 38. Valve body 36 includes the stepped opening 32 which communicates with channel 31. The body 36 includes threads 45 which are threadedly engaged with complementary threads of housing 12. O-ring seal 50 is disposed about body 36 in order to provide a seal between housing 12 and the body 36. Stepped opening 32 includes two valving members 160 and 170 in serial alignment with respective valve seats 64 and 74. Spring 59 is positioned on body 61 so as to bias valve member 160 toward ball valve 40 and into engagement with valve 170. Valve 170 is biased by spring 69 seated on valve member 160 so as to bias valve member 170 into engagement with ball 40. Body 61 includes an opening 63 and a valve seat 65 for third valve means 35. Valve means 35 comprises a ball valve which normally engages opening 63 so that when the valve is opened one-way flow is permitted only toward the chamber 13. Variable slope surface 17 may be either a compound surface as illustrated or a continuous variable slope surface. The initial low slope portion 39 provides for initial movement of the ball 40 before the ball engages the high slope portion 47.

Valves 160 and 170 are the same as those illustrated in co-pending patent application Ser. No. 738,116, incorporated by reference herein. The serial alignment of the valves assure proper valving during operation of the proportioning valve assembly. The variable slope surface 17 is annular and permits multi-directional movement of ball 40 so that the ball is responsive to vectorily both longitudinal deceleration and lateral deceleration of the vehicle.

Seal 108 is positioned between washer 52 and sleeve 101, the reduced diameter end 82 of second piston 80 extending through an opening in washer 52 and the opening 103 of sleeve 101 to engage third piston 105. Third piston 105 has a cup seal 106 disposed about an end thereof, and is slidably disposed within sleeve 101. Compensating slots or grooves 107 are located in the end of third piston 105. An opening 90 provides for fluid compensation communication via grooves 91 disposed about the periphery of sleeve 101.

Proportioning valves 20 contained within housing 12 operate as follows: Pressurized brake fluid received from inlet 33 passes through valve seat 76 and opening 72 to the associated outlet and to the wheel cylinder of a rear wheel brake. When the inlet pressure rises to a level sufficient to displace differential piston 70 to the left in FIG. 1, valve seat 76 moves toward poppet end 93 to cause restriction of the brake fluid and pressure communicated through opening 72 to the rear wheel brake. This establishes a first brake point A, and if the vehicle is unloaded and traveling on a low coefficient of friction roadway surface such as ice, the brake pressure would proceed in accordance with curve $A_1$ illustrated in FIG. 4. Because third valve means 35 remains normally closed by ball 40, the provision of increasing braking pressures by the vehicle operator to valve assemblies 20 will not cause second piston 80 to move to the left and permit the higher braking braking pressure to be communicated to the rear brakes. Third piston 105 has a larger diameter than reduced diameter end 82 of second piston 80, and therefore, the low pressure in cavity 30 of channel 31 is sufficient to cause third piston 105 to remain stationary while third valve means 35 remains closed. Thus, wheel lock-up and subsequent skidding on a low coefficient of friction roadway surface such as ice, is minimized or eliminated. If the vehicle should proceed to a higher coefficient of friction roadway surface, then an initial deceleration will be experienced by the vehicle and when deceleration reaches an initial level sufficient to move ball 40 along initial portion 39 of variable slope ramp 17, valves 160 and 170 are permitted to move upwardly and this permits third valve 35 to unseat and allow chamber 30 to communicate with chamber 13. Thus, the initial deceleration experienced by a vehicle when it is not on an icy road surface, permits cavity 30 to communicate with chamber 13 so that third piston 105 may be moved to the left (in FIG. 3) by second piston 80 and permit higher braking pressure to be communicated to the rear wheel brakes, in accordance with Curve B of FIG. 3. The resulting increase in output pressure increases the braking of the vehicle until deceleration causes ball 40 to roll up the increased slope portion 47 of surface 17. The resulting closure of second valve 34 (first valve 160 and then valve 170) prevents any fluid communication between cavity 30 of channel 31 and chamber 13, thereby preventing second piston 80 and third piston 105 from moving any further to the left. As piston 70 moves to the left in accordance with the increase in input pressure, seat 76 again approaches the poppet end 93 and establishes a higher level brake point C for a loaded vehicle. The restriction of fluid flow through valve seat 76 by poppet end 93 results in the pressure curve C1 for a loaded vehicle. The proportioning valve of the present invention includes the same inherent bypass system provided in the previously cited and incorporated patent application, wherein if one of the branches of the split circuit should fail, then there would be less deceleration of the vehicle and the second valve 34 in channel 31 would stay open so that a higher brake fluid pressure received from the master cylinder can be communicated to the associated brake cylinders. Thus, in case of failure, higher braking pressures can be communicated to the associated brake wheel cylinder to effect braking of the vehicle, and likewise for a system with a single proportioning valve.

The proportioning valve assembly of the present invention provides for an improvement in the ability to prevent or minimize wheel lock-up while the vehicle is on low coefficient of friction roadway surfaces, substantially eliminates fluid displacement losses, and improves fluid replenishment of the cavity 30. When the vehicle operator ceases braking, second piston 80 will return toward the right in FIG. 3, as will the third piston 105. Thus, it is necessary to replenish cavity 30 of channel 31 and this is accomplished by fluid flowing from chamber 13, around sleeve 101 via grooves 91, behind seal 106, and through compensation grooves 107 to cavity 30. It should be noted that during operation when the third piston 105 is displaced to the left by second piston 80, grooves 107 will move by stationary seal 106 so that pressurized fluid within cavity 30 will not be able to flow between cup seal 106 and the smooth diameter portion 109 of piston 105. The variable slope surface 17 comprising initial low slope portion 39 and high slope portion 47 enables the ball 40 to move in response to deceleration experienced upon different coefficient of friction surfaces along which the vehicle is traveling. Because of small reduced diameter end 82 of second piston 80, there are smaller displacement losses in the braking system during operation.

Although this invention has been described in connection with the illustrated embodiment, it will be obvious to those skilled in the art that various changes may be made in the form, structure, and arrangment of parts without departing from the scope of the invention.

We claim:

1. In a proportioning valve assembly for a vehicle having an inlet communicating with a fluid pressure source and an outlet communicating with a brake assembly, a pressure responsive assembly cooperating with the inlet and the outlet to vary fluid communication therebetween in response to pressurized fluid communicated to the inlet, an inertia sensing mass responsive to deceleration of the vehicle and cooperating with the pressure responsive assembly to assist in the variation of fluid communicated between the inlet and the outlet, a fluid-containing chamber communicating by means of a channel with the pressure responsive assembly, and first valve means disposed in said channel and engaged by said inertia sensing mass, the improvement comprising second valve means disposed in the channel and initially closed by means of said inertia sensing mass, an opening between said fluid-containing chamber and a portion of said channel, and the pressure responsive assembly having a reduced diameter end part engaging piston means of larger diameter disposed in said channel, the second valve means remaining closed and preventing communication of increased fluid pressure to the outlet until initial deceleration displaces said inertia sensing mass to effect opening of said second valve means.

2. The proportioning valve assembly in accordance with claim 1, wherein said inertia sensing mass is disposed on a variable slope surface, the initial deceleration causing said inertia sensing mass to be displaced along an initial portion of the variable slope surface.

3. The proportioning valve assembly in accordance with claim 1, wherein said second valve means comprises a one-way valve permitting fluid flow only in a direction toward said fluid-containing chamber.

4. The proportioning valve assembly in accordance with claim 3, wherein said second second valve means engages the first valve means disposed in said channel.

5. The proportioning valve assembly in accordance with claim 4, wherein said second valve means is disposed between said first valve means disposed in said channel and the piston means of larger diameter.

6. The proportioning valve assembly in accordance with claim 5, wherein the pressure responsive assembly includes a stationary sleeve disposed about said piston means of larger diameter, the stationary sleeve being located between two seals.

7. The proportioning valve assembly in accordance with claim 6, wherein said piston means of larger diameter includes one of said seals disposed about an end thereof, the end having slots to permit fluid flow therethrough.

8. The proportioning valve assembly in accordance with claim 7, wherein said sleeve has an end opening through which extends said reduced diameter end part, the other of said seals being disposed about said reduced diameter end part.

9. The proportioning valve assembly in accordance with claim 1, wherein the first and second valve means engage one another.

10. The proportioning valve assembly in accordance with claim 1, wherein said pressure responsive assembly comprises a differential piston in a bore of the valve assembly, a second piston including said reduced diameter end part and located for movement relative to the differential piston, and poppet valve means cooperating with the second piston.

11. The proportioning valve assembly in accordance with claim 10, wherein the reduced diameter end part of the second piston extends to abut the piston means of larger diameter.

12. The proportioning valve assembly in accordance with claim 11, wherein said piston means of larger diameter includes slots at an end thereof and a seal disposed about the end, movement of the piston means of larger diameter beyond a predetermined distance causing the seal to engage a non-slotted portion of said piston means.

13. The proportioning valve assembly in accordance with claim 12, wherein said engagement of the first valve means and inertia sensing mass provides for multi-directional movement of the mass relative to the first valve means.

14. The proportioning valve assembly in accordance with claim 13, wherein the first valve means includes serially aligned valve members and valve seats.

15. The proportioning valve assembly in accordance with claim 13, wherein the second valve means comprises a ball valve.

16. A pressure reducing valve assembly for a vehicle braking system, comprising a housing having an inlet and an outlet, a differential piston in said housing and subject to inlet and outlet pressures so that the valve assembly provides a pressure at said outlet reduced from the pressure at said inlet, a second piston disposed within said housing and movable relative to said differential piston, poppet valve means cooperating with said second piston, channel means for connecting said housing with a fluid-containing chamber, second valve means disposed in said channel means, an inertia sensitive object engaging said second valve means, third valve means disposed in the channel means and initially closed by means of said inertia sensitive object, an opening disposed between the fluid-containing chamber and a portion of said channel, and said second piston engaging a third piston disposed in said channel means, the third valve means cooperating with the third piston to prevent communication of increased fluid pressure to the outlet until initial deceleration displaces said inertia sensitive object to effect opening of the third valve means.

17. The pressure reducing valve assembly in accordance with claim 16, further comprising a sleeve member and a seal disposed about said third piston, the sleeve member having an opening through which extends a reduced diameter part of the second piston to engage the third piston which has a larger diameter.

18. The pressure reducing valve assembly in accordance with claim 17, wherein the third piston includes slots at an end thereof.

19. The pressure reducing valve assembly in accordance with claim 18, wherein the third valve means comprises a ball valve permitting one-way fluid flow toward said fluid-containing chamber.

20. The pressure reducing valve assembly in accordance with claim 19, wherein said second valve means includes resilient means disposed thereabout to exert a biasing force against said second valve means.

21. The pressure reducing valve assembly in accordance with claim 20, further comprising a connection leading from said channel means to a second pressure reducing valve assembly for the vehicle braking system.

22. The pressure reducing valve assembly in accordance with claim 20, further comprising a variable slope surface upon which is disposed the inertia sensitive object.

23. The pressure reducing valve assembly in accordance with claim 22, wherein the variable slope surface comprises an annular surface providing for multi-directional movement of the inertia sensitive object.

24. The pressure reducing valve assembly in accordance with claim 16, wherein the second and third valve means engage one another.

25. The pressure reducing valve assembly in accordance with claim 16, wherein said second valve means includes valve members and valve seats and the third valve means comprises a ball valve, the valve members and ball valve being serially aligned.

26. The pressure reducing valve assembly in accordance with claim 16, further comprising a sleeve member disposed about the third piston, the sleeve member disposed between two seals.

* * * * *